(12) United States Patent
Shishkov et al.

(10) Patent No.: US 10,647,859 B2
(45) Date of Patent: May 12, 2020

(54) TWO-COMPONENT PUTTY, METHOD FOR COATING A SUBSTRATE WITH SUCH PUTTY, SUBSTRATES COATED WITH SUCH PUTTY

(71) Applicant: Akzo Nobel Coatings International B.V., Arnhem (NL)

(72) Inventors: Igor Shishkov, Münster (DE); Dirk Seeger, Oldenburg (DE); Julia Krupp, Oldenburg (DE); Johannes Felker, Rastede (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 16/302,214

(22) PCT Filed: May 30, 2017

(86) PCT No.: PCT/EP2017/062959
§ 371 (c)(1),
(2) Date: Nov. 16, 2018

(87) PCT Pub. No.: WO2017/207523
PCT Pub. Date: Dec. 7, 2017

(65) Prior Publication Data
US 2019/0292384 A1    Sep. 26, 2019

(30) Foreign Application Priority Data

May 31, 2016   (EP) .................................... 16172090

(51) Int. Cl.
| C09D 5/34 | (2006.01) |
| C09D 7/62 | (2018.01) |
| C08G 18/36 | (2006.01) |
| C08K 9/04 | (2006.01) |
| C08K 7/22 | (2006.01) |
| C09D 7/40 | (2018.01) |
| C08G 18/78 | (2006.01) |
| C09D 175/08 | (2006.01) |
| C08L 91/00 | (2006.01) |
| C08G 18/66 | (2006.01) |
| C08G 18/79 | (2006.01) |
| C08G 18/48 | (2006.01) |
| C08K 3/26 | (2006.01) |

(52) U.S. Cl.
CPC ............... C09D 5/34 (2013.01); C08G 18/36 (2013.01); C08G 18/4891 (2013.01); C08G 18/6696 (2013.01); C08G 18/7831 (2013.01); C08G 18/792 (2013.01); C08L 91/00 (2013.01); C09D 7/62 (2018.01); C09D 7/70 (2018.01); C09D 175/08 (2013.01); C08K 7/22 (2013.01); C08K 9/04 (2013.01); C08K 2003/265 (2013.01)

(58) Field of Classification Search
None
See application file for complete search history.

(56) References Cited

U.S. PATENT DOCUMENTS 5,278,223 A * 1/1994 Gruenewaelder .. C08G 18/2825
156/307.3

FOREIGN PATENT DOCUMENTS

| CN | 102 585 677 A | 7/2012 |
| DE | 39 32 171 A1 | 4/1991 |
| DE | 44 01 572 A1 | 7/1995 |
| EP | 0 947 528 A1 | 10/1999 |
| WO | 2014/037312 A1 | 3/2014 |

OTHER PUBLICATIONS

XP055392163, Aerosil R 972: "Product information characteristic physico-chemical data", 2017, 2 pages.
XP002763758, WPI Week 201308 Thomson Scientific, "Paint useful for the blades of wind turbine, comprises polyurethane, polyester ether, a curing agent, an auxiliary agent, a solvent and titanium dioxide", 2012, 2 pages.

* cited by examiner

*Primary Examiner* — Sheeba Ahmed
(74) *Attorney, Agent, or Firm* — McDonnell Boehnen Hulbert & Berghoff LLP

(57) ABSTRACT

The present invention relates to a two-component putty comprising (1) a base component and (2) a curing component, wherein the base component comprises: —castor oil as resin component; and —a further resin component having a hydroxyl number in the range of from 00 to 800 mg KOH/g, wherein the curing component comprises a polyisocyanate, and wherein the two-component putty further comprises hollow microspheres and an organically modified inorganic filler. The present invention also relates to a method for coating a substrate by applying such putty and allowing the applied putty to cure. The invention further relates to a coated substrate obtainable by such method.

18 Claims, No Drawings

TWO-COMPONENT PUTTY, METHOD FOR COATING A SUBSTRATE WITH SUCH PUTTY, SUBSTRATES COATED WITH SUCH PUTTY

This application is the US national phase under 35 U.S.C. § 371 of international application PCT/EP2017/062959, filed May 30, 2017, which claims priority to European application 16172090.9, filed May 31, 2016.

FIELD OF THE INVENTION

The present invention relates to a two-component putty suitable for application on lightweight substrates, to a method for coating a substrate with such putty, and to a coated substrate obtainable by such method.

BACKGROUND OF THE INVENTION

Across the construction industry there are attempts to achieve maximum weight saving. This is especially true for structural bodies of moving objects that are subject to frequent acceleration and braking processes, for which weight saving leads to savings in energy and costs.

One branch of industry which is important in this context is the wind turbines sector. Rotor blades of wind turbines must be made of lightweight construction, in order to meet the requirements for efficient energy production.

A complicating factor, in particular in the offshore segment, is that wind turbines experience high erosive forces. Therefore, high-build (and hence weight-intensive) erosion protection coatings for lightweight components or lightweight-constructions are needed.

At the construction stage, the size of the objects, particularly of rotor blades, often entails the assembly of different, individually produced smaller components. The assembly of the individual components typically results in the presence of gaps and recesses, which have to be covered and/or leveled. A putty (filling compound) is used to provide a smooth and uniform surface that can suitably be coated with an erosion protection top coating. In view of the large quantity of putty needed for such smoothing or leveling, even a slight reduction in density of the putty results in significant weight saving.

There is a need for a putty that meets the basic requirements of a putty as a filling compound, whilst also resulting in a putty coating that is lightweight and therefore able to contribute to weight saving of the coated substrate.

SUMMARY OF THE INVENTION

The present inventors have found a novel two-component putty that results, after curing, in a lightweight putty coating.

Accordingly, the invention provides in a first aspect a two-component putty comprising (1) a base component and (2) a curing component, wherein the base component comprises:
  castor oil as resin component; and
  a further resin component having a hydroxyl number in the range of from 500 to 800 mg KOH/g,
wherein the curing component comprises a polyisocyanate, and wherein the two-component putty further comprises hollow microspheres and an organically modified inorganic filler.

The putty of the invention is easy to apply on substrates and results, after application and curing, into a putty coating of low density, therewith significantly contributing to weight saving. The putty is easy to process, even when applied on large components such as rotor blades of a wind turbine or aircraft, in particular since high temperature is not necessary for curing. Following application to a substrate, the putty of the invention may be cured at a temperature of at most 80° C.

The invention provides in a second aspect a method for coating a substrate, comprising applying a putty as hereinbefore defined to a substrate and allowing the applied putty to cure, preferably at a temperature of at most 80° C., more preferably in the range of from 15° C. to 60° C. In a third aspect, the invention provides a coated substrate obtainable by a method according to the second aspect of the invention.

The putty and method according to the invention are particularly suitable for lightweight substrates, such as rotor blades of wind turbines.

DETAILED DESCRIPTION OF THE INVENTION

The present invention relates to a putty. A putty, also called filling compound, is a coating material that is paste-like and has a higher viscosity under processing conditions than typical liquid coating materials.

Due to its paste-like character and high viscosity, a putty is typically used for covering and/or smoothing substantial irregularities, gaps or holes in surfaces. Its high sag resistance ensures that the material does not run from the substrate after application and prior to curing.

A putty typically comprises a relatively high amount of filler and has a high solids content (nonvolatile fraction). As a result, contraction effects during drying and/or curing are minimized. Due to the high amount of putty typically needed for covering and/or smoothing, some visible contraction may nevertheless occur. Therefore, putties are often applied generously and excess material is sanded off after drying and/or curing.

The putty according to the invention is a two-component putty. It comprises a base component (1) and a curing component (2). The individual components (1) and (2) are manufactured and stored separately from each other and are combined shortly before use to obtain the putty. The pot life (the time during which a putty can be applied at a temperature in the range of from 15° C. to 25° C. without the viscosity increasing as a result of crosslinking reactions to an extent that application is no longer possible), depends on the constituents used, in particular the castor oil, the further resin component, and the polyisocyanate. Typically, the pot life of the putty is in the range of from 0.1 minutes to 15 minutes, preferably of from 0.5 minutes to 10 minutes.

Curing of the two-component putty occurs through chemical reaction of reactive functional groups of the binder constituents in the putty, in particular through reaction of the hydroxyl groups of the resin components, i.e. the castor oil and the further resin component, with the isocyanate groups of the polyisocyanate. Through these crosslinking reactions a coating film is formed, i.e. a cured coating layer is formed. The term "binder" is used herein in relation to those components of the base component that are primarily responsible for film formation, in particular the castor oil, the further resin, and the polyisocyanate. The polyisocyanate is also referred to as curing agent or crosslinking agent.

The two-component putty comprises castor oil as resin component (A) in the base component (1).

Castor oil is a natural product containing various triglycerides esterified with glycerol. Ricinoleic acid makes up the main fraction of the fatty acids, with a typical concentration of more than 80 wt %, based on the total amount of fatty acids. Castor oil can be used directly, i.e. as the familiar plant-derived raw material, in the base component (1) of the putty.

Preferably, the putty comprises in the range of from 15 to 50 wt % castor oil, more preferably of from 20 to 40 wt %, based on the total weight of the putty.

The two-component putty further comprises in the base component (1) a further resin component having a hydroxyl number in the range of from 500 to 800 mg KOH/g (measured according to DIN 53240).

The further resin component may be any resin component known to be suitable for coating materials or putties. The further resin component may be a single binder polymer. Alternatively, the further resin component is a mixture of different organic binder compounds, for example a mixture of polymers and/or oligomers with optionally monomeric compounds. The further resin component may for example be a mixture of hydroxy-functional polyether and/or polyester polymers and/or corresponding copolymers with hydroxy-functional monomeric compounds, provided the hydroxyl number is in the range of from 500 to 800 mg KOH/g.

A preferred further resin component comprises or consists of (i) a polyhydroxy-functional adduct of an organic primary diamine (e.g. ethylene diamine) and propylene oxide, obtained by reacting a diamine with propylene oxide at such ratio that both N—H bonds of each primary amino group react with propylene oxide in an addition reaction under ring opening of the propylene oxide molecule, and/or (ii) a polyhydroxy-functional adduct as described under (i) that has been subsequently modified by reaction of the hydroxyl groups, formed as a result of the ring opening of a propylene oxide molecule, with an organic compound, for example by esterification with fatty acids. In the preparation of such adducts, one propylene oxide molecule may substitute the hydrogen of an N—H bond. Alternatively, a plurality of propylene oxide molecules may be added by chain extension. Corresponding adducts may be prepared by deliberate adjustment of the reaction conditions. The resulting structure can be verified by determination of the number-average molecular weight and hydroxyl number. An advantage of such components is that, as a result of the existence of the tertiary amino groups in the high-functionality polyols, a catalytic effect is obtained that is sufficient for reaction with isocyanates. Thus, the further resin component functions not only as a crosslinked film-forming component but also as an amine catalyst. Further resin components of this type are commercially available as Neukapol (from Altropol Kunststoff GmbH).

Preferably, the further resin component has an OH number in the range of from 600 to 800 mg KOH/g (measured according to DIN 53240).

The amount of further resin component is preferably in the range of from 2 to 25 wt %, more preferably of from 3 to 15 wt %, even more preferably of from 4 to 10 wt %, based on the total weight of the putty.

The two-component putty further comprises hollow microspheres and an organically modified inorganic filler. Typically, and therefore preferably, these two components are present in the base component of the putty.

Hollow microspheres are known in the art. Surprisingly, however, it has been found that such hollow microspheres can be used in the putty without detriment to its fundamental qualities.

Hollow microspheres are so-called lightweight fillers. The spheres are typically filled with gas such as air, nitrogen and/or carbon dioxide or n-alkanes, isoalkanes and/or neoalkanes. The hollow microspheres may have inorganic or organic sphere shells. Inorganic hollow microspheres include glass, silicate, silicon dioxide, and ceramic microspheres. Organic microspheres include polymeric microspheres, such as styrene-based and/or poly(meth)acrylate-based plastomers, acrylonitrile-based polymers such as polyacrylonitrile-methyl methacrylate copolymers or polyacrylonitrile polymers.

Suitable hollow microspheres are commercially available, for example under the tradenames Expancel DE (from AkzoNobel), 3M Glass Bubbles (from 3M), or Dualite E (from Henkel).

Preferably the hollow microspheres are organic hollow microspheres, more preferably polymeric hollow microspheres, such as for example Expancel.

The particle diameter (D50 value, volume-based) of the hollow microspheres is typically in the range of from 5 to 200 micrometers, preferably of from 20 to 120 micrometers (determined by laser diffraction in accordance with ISO 13320:2009-10).

The amount of the hollow microspheres is preferably in the range of from 0.5 to 5.0 wt %, more preferably of from 0.75 to 3.0 wt %, based on the total weight of the putty. The use of such small amount already leads to a significant reduction in the density of the putty.

The organically modified inorganic filler may be any suitable inorganic filler modified with an organic compound. For the purpose of the present application, the term organically modified inorganic filler does not include inorganic hollow microspheres, Inorganic fillers include various substances, typically in granular or powder form, which are used for the purpose of achieving particular physical properties of coating compositions. Suitable inorganic fillers for modification include carbonates such as calcium carbonate, dolomite or barium carbonate, sulfates such as calcium sulfate and barium sulfate, and silicates and optionally phyllosilicates such as talc, pyrophyllite, mica, kaolin, feldspar, precipitated calcium, aluminum, calcium/aluminum, sodium/aluminum silicates, mullite, wollastonite, nepheline such as nepheline syenite, and silicon dioxide such as quartz and cristobalite. For the purpose of the present invention, the group of silicates includes silicon dioxide. Preferred inorganic fillers for modification are carbonates such as calcium carbonate, dolomite or barium carbonate, with calcium carbonate being especially preferred.

Organic modification of inorganic fillers is known in the art. The filler to be modified serves as substrate, to which at least one organic modifying component is applied. Such modification or coating of fillers may take place under generally known conditions for physisorption and/or chemisorption. It will be appreciated that the extent and nature of the modification depends on the reaction conditions applied and the substrate properties. Through appropriate choice of the modifying components, the filler surface can be adapted. The surface of the inorganic filler is hydrophobized by the attachment of organic materials. Thus, the compatibility of the filler with the hydrophobic polymer matrix of the putty is increased, by improving physical adsorption and optionally chemical reaction to the other putty components.

The putty preferably comprises an inorganic filler modified with fatty acids. Suitable fatty acids are known in the art and include lauric acid, palmitic acid and/or stearic acid, preferably stearic acid.

The amount of organically modified inorganic filler is preferably in the range of from 5 to 30 wt %, more preferably of from 7.5 to 25 wt %, even more preferably of from 10 to 20 wt %, based on the total weight of the putty.

The two-component putty comprises—in the curing component (2)—a polyisocyanate.

Polyisocyanates are organic compounds having on average more than one isocyanate group per molecule and are known in the art. The polyisocyanate may be aliphatic or aromatic. Di-isocyanates, and dimers or trimers of di-isocyanates, such as uretdiones and isocyanurates or biurets, are preferred. The polyisocyanate may for example be hexamethylene di-isocyanate, octamethylene di-isocyanate, decamethylene di-isocyanate, dodecamethylene di-isocyanate, tetradecamethylene di-isocyanate, trimethylhexane di-isocyanate, tetramethylhexane di-isocyanate, isophorone di-isocyanate (IPDI), 2-isocyanatopropylcyclohexyl isocyanate, dicyclohexylmethane 2,4'-di-isocyanate, dicyclohexylmethane 4,4'-di-isocyanate, 1,4- or 1,3-bis(isocyanatomethyl)cyclohexane, 1,4- or 1,3- or 1,2-di-isocyanatocyclohexane, and 2,4- or 2,6-di-isocyanato-1-methylcyclohexane, or a dimer or trimer thereof, or a mixture of two or more thereof. Uretdiones and isocyanurates or biurets are particularly preferred. Preferred polyisocyanates are hexamethylene di-isocyanate, isophorone di-isocyanate, mixtures thereof, and its various trimers and dimers. The polyisocyanate may be a modified polyisocyanate, such as for example a polyether-modified and/or polyester-modified polyisocyanate. The isocyanate groups in these components may be free or may be blocked with known blocking agents. Preferably the isocyanate groups are non-blocked, i.e. free, isocyanate groups.

Particularly preferred is a polyisocyanate containing a biuret group. The polyisocyanate containing a biuret group is preferably an aliphatic polyisocyanate. The aliphatic polyisocyanate containing a biuret group may be obtained from 1,6-hexamethylene di-isocyanate (HDI), 1,3-cyclohexyl di-isocyanate, 1,4-cyclohexyl di-isocyanate (CHDI), diphenylmethane di-isocyanates, 2,2,4- and/or 2,4,4-trimethyl-1,6-hexamethylene di-isocyanate, dodecamethylene di-isocyanate, isophorone di-isocyanate (IPDI), by oligomerization with biuret formation. Three molecules of HDI react for example with one molecule of water, with elimination of one molecule of carbon dioxide, to yield an HDI biuret.

Particularly preferred is a biuret of an aliphatic polyisocyanate based on isophorone di-isocyanate and/or hexamethylene di-isocyanate, more in particular the biuret of hexamethylene di-isocyanate.

The polyisocyanate preferably has an isocyanate content in the range of from 5.8% to 27%, more preferably of from 15% to 26%, even more preferably of from 20% to 26%. The isocyanate content is determined in accordance with DIN EN ISO 11909 by reacting the polyisocyanate with excess dibutylamine and back-titrating with hydrochloric acid against bromophenol blue.

The amount of the polyisocyanate is preferably in the range of from 20 to 60 wt %, more preferably of from 30 to 50 wt %, even more preferably of from 35 to 45 wt %, based on the total weight of the putty.

The putty may comprise, typically in its base component (1), further components generally known as constituents for coating compositions, such as still further resin components (e.g. hydroxy-functional resin components based on castor oil), solvents, pigments or additives.

The putty may include organic solvents and/or water. A particular advantage, however, is that the putty can be produced in solvent-free form. The putty preferably contains less than 5 wt % of organic solvent, more preferably less than 3 wt %, even more preferably less than 1.0 wt %, based on the total weight of the putty. The putty preferably contains no or only minor amounts of water. Preferably, the putty contains less than 1.0 wt %, more preferably less than 0.2 wt %, even more preferably less than 0.01 wt % of water, based on the total weight of the putty. Organic solvent or water is preferably not explicitly added, e.g. to adjust the viscosity of the putty, but merely present, if at all, in small amounts as part of typical coating additives.

The putty may comprise a catalyst for the catalysis of the reaction of hydroxyl groups with isocyanate groups. The putty preferably contains 0.01 to 2 wt %, based on the total weight of the putty, of such catalyst. Suitable catalysts are the known in the art and include metal catalysts such as tin, molybdenum, zirconium or zinc catalysts and amine catalysts such as 2-(2-dimethylaminoethoxy) ethanol. Particularly suitable catalysts are tin compounds such as dialkyltin dicarboxylates, in particular dimethyltin dilaurate, dibutyltin dilaurate.

The putty may comprise typical additives such as antioxidants, de-aerating agents, wetting agents, dispersants, adhesion promoters, rheology modifiers such as thickeners, waxes and wax like compounds, biocides, matting agents, radical scavengers, light stabilizers or flame retardants. Additives may be present in customary amounts, typically in the range of from 0.1 to 10 wt % based on the total weight of the putty.

The putty may comprise soluble dyes, color pigments, or further catalysts.

The putty preferably comprises in its base component a polyamine having two, three, four or five amino groups, more particularly a diamine, in an amount of 0.1 to 2.0 wt %, based on the total weight of the putty. Suitable polyamines are known in the art and include aliphatic, aromatic or aralphatic (mixed aliphatic-aromatic) polyamines. Preference is given to diethyltoluenediamine.

The solids content of the putty is preferably more than 90%, more preferably more than 95%, even more preferably more than 99%.

Reference herein to solids content (non-volatile fraction) is to the weight fraction which remains as a residue upon evaporation under specified conditions (according to DIN EN ISO 3251; evaporating at 130° C. for 60 minutes).

The viscosity of the putty, as measured by means of a rotary viscometer at a shear rate of 1 s$^{-1}$ and a temperature of 23° C. (see DIN 53019), 30 seconds after having combined and mixed the base component and the curing component, is preferably in the range of from 20,000 to 250,000 mPa·s, more preferably of from 30,000 to 200,000 mPa·s, even more preferably of from 40,000 to 150,000 mPa·s.

The density of the putty is preferably less than 1.5 g/cm$^3$, more preferably less than 1.0 g/cm$^3$. Preferred ranges are of from 0.4 to 1.5 g/cm$^3$, especially preferably of from 0.5 to 1.0 g/cm$^3$.

In one preferred embodiment the putty of the invention comprises:

15 to 50 wt % castor oil as resin component;
2 to 25 wt % of the further resin component;
20 to 60 wt % polyisocyanate;
0.5 to 5.0 wt % hollow microspheres; and
5 to 30 wt % organically modified inorganic filler,
based on the total weight of the putty.

Within this preferred embodiment, all preferred features described hereinabove, are likewise preferred features. Thus, the preferred embodiment may be combined with any one or any combination of features described above.

The molar ratio of the total of any hydroxyl groups and any amino groups in base component (1) to any isocyanate groups in curing component (2) is preferably in the range of from 1.0/0.9 to 1.0/1.5.

All preferred features mentioned herein are preferred as such and in combination with other preferred features.

Preferred embodiments and features described in connection with the first aspect of the invention (the putty) also apply to further aspects of the invention, i.e. the method for coating a substrate and the coated substrate.

In a second aspect, the invention relates to a method for coating a substrate. The method comprises application of the putty according to the invention to a substrate. Application may take place by way of customary automated techniques, using conventional putty application equipment. Alternatively, the putty may be applied manually using a metal or plastic spatula.

In order to produce a cured coating, the applied putty is allowed to cure, preferably at a temperature of at most 80° C., more preferably at most 60° C., even more preferably in the range of from 15 to 60° C., still more preferably of from 15 to 50° C.

The duration required for complete curing varies greatly with the curing temperature selected, and is typically in the range from 30 minutes to ten days. Curing may for example require 30 minutes at a curing temperature of 40° C. to 60° C., or seven days at a curing temperature of 15 to 25° C.

For curing, customary thermal curing equipment and techniques may be used such as a tunnel oven, a radiant NIR and IR heat source, a blower or blowing tunnel. Such equipment and techniques may be combined.

Depending on whether only minor unevenesses or relatively deep gaps or cracks in the substrate are to be covered, the dry film thickness of the cured putty coating may vary between several hundreds of micrometers and several centimeters.

The putty may be applied to any substrate. The substrate may be a single material or composed of various materials. The substrate preferably is a metal substrate such as steel or aluminum or a plastic substrate, more preferably a fiber-reinforced plastic substrate. Epoxy resin-based plastic substrates, in particular fiber-reinforced epoxy resin-based plastic substrates, are particularly preferred. Suitable fibers for reinforcement are glass fiber, aramid fiber and/or carbon fiber, or natural fibers such as hemp or sisal. Preferred substrates are lightweight substrates such as glass fiber-reinforced epoxy resin based plastic substrates. The substrate may have any desired size and shape. Particularly preferred substrates are rotor blades of wind turbines.

The putty is preferably applied to regions of the substrate that are uneven or comprise gaps and recesses. Such regions may arise, for example, in the course of construction, by joining different individual components. Such regions may also arise through erosion-induced damage to the substrate.

Preferably, the putty is applied directly to the substrate. Thus, the putty coating formed by applying and curing the putty is in direct contact with the substrate; no further coating layer is applied between substrate and putty coating A further coating layer may be applied to the putty coating, for example a surfacer or an erosion-resistant top coating, to produce a multicoat coating system.

The invention further relates to a coated substrate obtainable by the method according to the second aspect of the invention.

The present invention is further illustrated with the following non-limiting examples.

Examples

The base component and curing component of various putties (I=according to the invention; C=comparative) were prepared by combining the respective constituents and homogeneously mixing them in a dissolver (see table 1 for the composition of the putties).

The respective base components and the respective curing components were then homogeneously mixed in the proportions stated in the table. At 30 seconds after combining and mixing of base component (1) and curing component (2), all putties had a viscosity of about 100,000 mPa·s as measured by rotary viscometer under a shearing load of 1 s$^{-1}$ and at a temperature of 23° C. (DIN 53019).

TABLE 1

| Putty composition (all constituents in wt %) | | | | | | | |
|---|---|---|---|---|---|---|---|
| Constituents | I-1 | I-2 | I-3 | C-1 | I-4 | I-5 | I-6 |
| Base component | | | | | | | |
| SETATHANE D 1145 | 18.3 | 18.3 | 18.3 | 10.0 | 18.3 | 18.3 | 18.3 |
| Castor oil | 42.3 | 42.3 | 42.3 | 20.0 | 42.3 | 42.3 | 42.3 |
| Further resin component; OH no. = 740 mg KOH/g | 7.4 | 7.4 | 7.4 | 7.4 | 7.4 | 7.4 | 7.4 |
| Molecular sieve | 5.00 | 5.00 | 5.00 | 5.00 | 5.00 | 5.00 | 5.0 |
| Defoamer | 0.50 | 0.50 | 0.50 | 0.50 | 0.50 | 0.50 | 0.5 |
| Catalyst | 0.10 | 0.10 | 0.10 | 0.10 | 0.10 | 0.10 | 0.1 |
| Light stabilizer | 0.5 | 0.5 | 0.5 | 0.5 | 0.5 | 0.5 | 0.5 |
| Diethyltoluene diamine | 0.5 | 0.5 | 0.5 | 0.5 | 0.5 | 0.5 | 0.5 |
| Rheological assistant | 3.5 | 3.5 | 3.5 | 3.5 | 3.5 | 3.5 | 3.5 |
| Thixotropic agent | | | | 2.0 | | | |
| calcium carbonate, fatty acid-modified | 20.8 | 20.8 | 17.5 | | 19.4 | 19.4 | 11.9 |
| Filler mixture | | | | 50.5 | | | |
| Expancel 920 DE 80 d30 | 1.1 | | | | 2.5 | | |
| Expancel 920 DE 40 d30 | | 1.1 | | | | 2.5 | |
| Dualite E130-095D | | | 4.4 | | | | 10.0 |
| Total | 100.0 | 100.0 | 100.0 | 100.0 | 100.0 | 100.0 | 100.0 |
| Curing component | | | | | | | |
| HDI trimer with biuret groups (NCO content 22.0%) | 66 | 66 | 66 | 33 | 66 | 66 | 66 |
| Sum total | 166 | 166 | 166 | 133 | 166 | 166 | 166 |
| Density in g/cm$^3$ | 0.84 | 0.82 | 0.86 | 1.7 | 0.61 | 0.59 | 0.63 |

Immediately after its preparation, the putty was directly applied to a glass-fiber reinforced epoxy resin based test specimen in two different application modes:
1. manual application with a spatula
2. automated pouring with a twin feed applicator, followed by manual spreading with a spatula.

Curing took place by storage during seven days at a temperature of 20 to 25° C. The dry film thickness was 1,000 micrometers.

The sandability of the cured putty coatings was good. The sanded putty coatings provided a homogeneous surface suitable for subsequent coating with a top coating.

It was found that the putties of the invention possessed an excellent rheology profile despite the large volume fraction of hollow microspheres. They were easy to apply in both modes of application, and exhibited very good sag resistance. Accordingly they are suitable for covering and leveling of substantial unevennesses, gaps, or holes. The putties of the invention have an a very low density and are ideally suited for use on components for lightweight constructions, particularly rotor blades of wind turbines.

The invention claimed is:

1. A two-component putty comprising (1) a base component and (2) a curing component,
wherein the base component comprises:
castor oil as resin component; and
a further resin component having a hydroxyl number in the range of from 500 to 800 mg KOH/g,
wherein the curing component comprises a polyisocyanate,
and wherein the two-component putty further comprises hollow microspheres and an organically modified inorganic filler,
wherein the putty comprises
15 to 50 wt % castor oil as resin component;
2 to 25 wt % of the further resin component;
20 to 60 wt % polyisocyanate;
0.5 to 5.0 wt % hollow microspheres; and
5 to 30 wt % organically modified inorganic filler,
based on the total weight of the putty.

2. The two-component putty according to claim 1, wherein the further resin component has an OH number in the range of from 600 to 800 mg KOH/g.

3. The two-component putty according to claim 1, wherein the polyisocyanate is an aliphatic polyisocyanate containing a biuret group.

4. The two-component putty according to claim 1, wherein the organically modified inorganic filler is organically modified calcium carbonate.

5. The two-component putty according to claim 1, wherein the organically modified inorganic filler is an inorganic filler modified with fatty acids.

6. The two-component putty according to claim 1, wherein the hollow microspheres are organic hollow microspheres.

7. The two-component putty according to claim 1, wherein the viscosity of the putty as measured by rotary viscometer at a shearing rate of 1 $s^{-1}$ and at a temperature of 23° C., 30 seconds after having combined and mixed the base component and the curing component, is in the range of from 20,000 to 250,000 mPa·s.

8. A method for coating a substrate, comprising:
applying a two-component putty according to claim 1 to a substrate; and
allowing the applied putty to cure.

9. The method according to claim 8, wherein the putty is applied directly to the substrate.

10. The method according to claim 8, wherein the substrate is a plastic substrate.

11. A coated substrate obtainable by a method according to claim 8.

12. The two-component putty according to claim 1 wherein the hollow microspheres are polymeric hollow microspheres.

13. The two-component putty according to claim 7 wherein wherein the viscosity of the putty as measured by rotary viscometer at a shearing rate of 1 $s^{-1}$ and at a temperature of 23° C., 30 seconds after having combined and mixed the base component and the curing component, is in the range of from 30,000 to 200,000 mPa·s.

14. The two-component putty according to claim 7 wherein wherein the viscosity of the putty as measured by rotary viscometer at a shearing rate of 1 $s^{-1}$ and at a temperature of 23° C., 30 seconds after having combined and mixed the base component and the curing component, is in the range of from 40,000 to 150,000 mPa·s.

15. The method according to claim 8 wherein the applied putty is allowed to cure at a temperature of at most 80° C.

16. The method according to claim 8 wherein the applied putty is allowed to cure at a temperature in the range of from 15° C. to 60° C.

17. The method according to claim 8 wherein the substrate is an epoxy resin based plastic substrate.

18. The method according to claim 8 wherein the substrate is a fiber-reinforced epoxy resin-based plastic substrate.

* * * * *